United States Patent
Grouset et al.

(10) Patent No.: US 8,182,558 B2
(45) Date of Patent: May 22, 2012

(54) DEVICE FOR GENERATING HYDROGEN FROM HYDROCARBON, WATER AND OXYGEN COMPRISING A REACTION AND HEAT EXCHANGE CHAMBER

(75) Inventors: Didier Grouset, Albi (FR); Jean-Christophe Hoguet, Ano Peraia (GR); Samuel Lecoq, Albi (FR); Jean Calvez, Saint-Herblain (FR); Marc Quemeneur, Nantes (FR); Lionel Jodet, Nantes (FR)

(73) Assignees: N-GHY, Albi (FR); DCNS, Paris (FR)

( * ) Notice: Subject to any disclaimer, the term of this patent is extended or adjusted under 35 U.S.C. 154(b) by 971 days.

(21) Appl. No.: 11/910,790

(22) PCT Filed: Apr. 3, 2006

(86) PCT No.: PCT/FR2006/050292
§ 371 (c)(1),
(2), (4) Date: Apr. 25, 2008

(87) PCT Pub. No.: WO2006/106259
PCT Pub. Date: Oct. 12, 2006

(65) Prior Publication Data
US 2009/0220390 A1    Sep. 3, 2009

(30) Foreign Application Priority Data
Apr. 5, 2005 (FR) .................... 05 03381

(51) Int. Cl.
*B01J 7/00*       (2006.01)
*B01J 10/00*      (2006.01)
*C10J 3/46*       (2006.01)
*C01B 6/24*       (2006.01)
*C01B 3/24*       (2006.01)

(52) U.S. Cl. ........... 48/61; 48/197 R; 422/625; 423/644; 423/650

(58) Field of Classification Search .......... 48/61, 197 R; 423/644, 648.1, 650; 422/625–629
See application file for complete search history.

(56) References Cited

U.S. PATENT DOCUMENTS 3,985,518 A * 10/1976 Anderson ................. 48/111
6,767,376 B1 *  7/2004 Perna et al. ............... 48/215
(Continued)

FOREIGN PATENT DOCUMENTS
EP        0 600 621 A1    6/1994
(Continued)

OTHER PUBLICATIONS
International Search Report Aug. 29, 2006.

*Primary Examiner* — Matthew Merkling
(74) *Attorney, Agent, or Firm* — RatnerPrestia (57) ABSTRACT

A device generating hydrogen from a hydrocarbon, oxygen and water. The reaction is carried out at high temperature. The device includes a first substantially cylindrical zone surrounding the reaction chamber circulates water vapor and hydrocarbon, excluding the reaction products, the zone being separated from the reaction chamber to recover heat lost by the reaction chamber, to preheat the mixture circulating in the first zone. The reagent(s) are in contact with the walls of said first zone to exchange produce heat. A substantially cylindrical second zone surrounds the first zone and circulates water to be vaporized, the water is in contact with the walls of said second zone. The first and second zones are separated such that water circulating in the second zone is preheated by heat of the first zone where the water of the second zone is mixed with the hydrocarbon and introduced into the first zone.

12 Claims, 3 Drawing Sheets

U.S. PATENT DOCUMENTS

| | | |
|---|---|---|
| 2001/0009653 A1 | 7/2001 | Clawson et al. |
| 2002/0007595 A1 | 1/2002 | Maier-Roeltgen et al. |
| 2003/0188475 A1 | 10/2003 | Ahmed et al. |
| 2004/0151663 A1* | 8/2004 | Nougier et al. ............ 423/648.1 |
| 2004/0163311 A1* | 8/2004 | Ahmed et al. ............... 48/127.9 |
| 2004/0172877 A1* | 9/2004 | Wunning .................... 48/102 A |
| 2004/0265224 A1* | 12/2004 | Papavassiliou et al. ...... 423/651 |

FOREIGN PATENT DOCUMENTS

EP           1 193217 A1     4/2002

* cited by examiner

DEVICE FOR GENERATING HYDROGEN FROM HYDROCARBON, WATER AND OXYGEN COMPRISING A REACTION AND HEAT EXCHANGE CHAMBER

FIELD OF THE INVENTION

The present invention pertains to a device for generating hydrogen from oxygen, water and gaseous or liquid hydrocarbon.

More particularly, it pertains to a reforming device for generating hydrogen.

BACKGROUND

It is known that hydrogen is the gas used for supplying the fuel cells that make up high-yield electricity generators. The generalization of the use of fuel cells should contribute to reducing the greenhouse effect.

The generation of hydrogen that is needed for fuel cells or for other industrial applications can be obtained by reacting a hydrocarbon and water. The hydrocarbon that is most often used for producing hydrogen is natural gas (mainly consisting of methane, but also ethane or propane), in a catalytic vapor reforming reactor. However, hydrogen may be produced from other hydrocarbons as well, and in particular such petroleum cuts as diesel fuel, naphtha, kerosene, gasoline, liquefied petroleum gas (propane, butane), and such biofuels as the biogases, vegetable oils and their esters, ethanol or methanol, adapting the temperature conditions and the catalysts to the hydrocarbon and to the process, which can be a vapor reforming, a partial oxidation or even an autothermal vapor reforming.

Hydrogen is generally produced in two steps.

During a first step called "reforming," the carbon of the hydrocarbon is combined with the oxygen of water to provide mainly carbon monoxide CO and to release hydrogen. Then, during a second step, the carbon monoxide CO is again combined with water to provide carbon dioxide $CO_2$ and hydrogen $H_2$.

The reforming operation that produces $CO+H_2$ is an endothermic reaction, i.e., a reaction, to which heat must be provided. To this end, an exothermic reaction is used, which consists of the combustion of a fraction of the hydrocarbon flow with a flow of oxygen. Thus, a fraction of the hydrocarbon constitutes a fuel for providing heat and the complementary hydrocarbon fraction constitutes the main reagent which will provide the hydrogen. Therefore, it is understood that the burned hydrocarbon fraction must be minimized to maximize the reformed hydrocarbon fraction.

The reforming gases are produced at high temperature and the heat that they contain can be recovered for preheating the fluids entering the reaction chamber, or reagents, i.e., the water, the hydrocarbon and the flow of oxygen (which may be the oxygen of the air or pure oxygen, or even a mixture). Thus, the reforming reaction is carried out with hot reagents, which makes it possible to reduce the burned hydrocarbon fraction.

SUMMARY OF THE INVENTION

One objective of the present invention is to provide a device making it possible to minimize heat losses to the external environment and therefore to improve the yield of the hydrogen generator.

Another objective is to reduce the volume of the hydrogen generating device by combining the different steps in the same chamber, in particular in order to facilitate its mechanical integration.

Still another objective is to limit or suppress the connections of fluids or hot reagents among the different modules or steps of the hydrogen generation process (preheating of water, evaporation, superheating, preheating of the oxygen flow, preheating of the hydrocarbon, mixing and chemical reaction, cooling of the reforming gases . . . ), thus reducing the heat losses and the thermomechanical problems of hot connections among a plurality of chambers under pressure.

The reforming device according to the present invention is designed to produce hydrogen from hydrocarbon, and in particular from diesel fuel, water and oxygen. It may also operate with other hydrocarbons mentioned above, such as kerosene, naphtha, gasoline, liquefied petroleum gas, natural gas and such biofuels as vegetable oils or their esters, ethanol. It can also be adapted to use air or another oxygen flow instead of pure oxygen. It comprises:

a reaction chamber into which the reactive fluids are introduced to perform a reforming reaction, which produces hydrogen and carbon oxides from the reagents, this reaction being carried out at high temperature, a first, more or less cylindrical zone surrounding the reaction chamber and in which circulates a mixture of water vapor or hydrocarbon to be introduced into the reaction chamber, to the exclusion of the products of the reaction, this zone being separated from the reaction chamber in order to recover, at least in part, the heat lost by the reaction chamber, so as to preheat the mixture circulating in the first zone, the reagent or reagents being in direct contact with the walls of this first zone to carry out heat exchanges, a second, more or less cylindrical zone surrounding the first zone and in which circulates water in order to preheat it and vaporize it, the water being in direct contact with the walls of this second zone, the separation between the first and second zones being such that the water circulating in the second zone recovers the heat lost by the first zone in order to preheat the water, and means for mixing water from the second zone with hydrocarbon before introducing the mixture in the form of vapor into the first zone, the design being such that the inner surface of the outer wall of the device, which is made up of the inner surface of the outer surface of the second zone, in contact with the water, is at a more or less lower temperature than the temperature of the reaction chamber.

Thus, the temperature of the reaction chamber, which is on the order of 800° C. to 1,400° C., depending on the hydrocarbons, where the reforming is carried out, is surrounded by the first zone in which circulates a mixture of water vapor and hydrocarbon, whose temperature is on the order of 500° C. to 900° C., the heat of this mixture of fluids being supplied by the reaction chamber and this first zone is itself surrounded by the second zone at a temperature, for example, on the order of 270° C. when the pressure in the device is on the order of 55 bars. However, the device may be adapted for operating at other pressures, in the range of 1 to 100 bars.

The reaction chamber is thermally insulated from the outside by the jackets that make up the two zones and the inner surface of the outer wall is at a temperature on the order of 270° C., i.e., at a temperature very clearly lower than that of the reaction. There are only very little heat losses and the energy yield is optimized. Under these conditions, the choice of the materials making up this outer wall, which should generally resist pressure, is easier than if the outer wall was at a temperature on the same order of magnitude as the temperature of the reaction chamber or even of the first zone.

In one embodiment, the reaction chamber comprises two parts, the first of which is the seat of the reaction and the second of which constitutes a duct for discharging the products of the reaction, these two parts being such that the heat exchange between the second part of the reaction chamber, which is closest to the outlet of the reaction products, and the first zone is more or less greater than the heat exchange between the first part of the reaction chamber and the first zone.

Preferably, the discharge duct has a more or less rectilinear configuration in this embodiment, and the products only circulate in only one direction in this discharge duct. Thus, there is no obstacle to the discharge and in this way, the discharge is carried out in a fast and simple manner. Because of the configuration of the device, the embodiment is easy and not very burdensome. In addition, the reliability of the device is high because there is no transverse wall subjected to a too-high heat flow. In particular, there is no pipe coil, nor bundle of tubes, nor blade immersed in the flow of hot products. Thus, the mechanical stresses are minimized, in particular because the temperature is more homogeneous and, on average, lower. Because of this lower temperature, corrosion is minimized. Consequently, the lifetime is increased.

Preferably, in this case, the device comprises a third zone inside the second part of the reaction chamber, this third zone being intended to recover, by heat exchange, the heat of this second part of the reaction chamber, in order to preheat the reagents or fluids that circulate in this third zone, the wall separating the reagents or fluids, on the one hand, and the products of the reaction at high temperature, on the other hand, being more or less cylindrical and smooth. In one embodiment, this third zone comprises:
  means for superheating the water vapor,
  means for vaporizing a liquid hydrocarbon and mixing it with the water vapor, and
  possibly, means for superheating the mixture of water vapor and hydrocarbon.

As a variant, the hydrocarbon is gaseous and the third zone comprises:
  means for circulating the water in order to superheat it,
  means for mixing the gaseous hydrocarbon with the water vapor, and
  possibly, means for superheating the mixture of water vapor and gaseous hydrocarbon.

In one embodiment, the device comprises:
  means for creating fine droplets of liquid hydrocarbon,
  means for mixing these droplets with water vapor, the temperature of the water vapor making it possible to vaporize at least a fraction of the droplets, and
  a hot surface, and in particular one heated by heat exchange with the reaction chamber, to a temperature sufficient to vaporize the fraction of the droplets not vaporized by mixing with the water vapor;
  the means for creating droplets projecting the latter towards the hot surface.

Thus, a means for fast vaporization of the hydrocarbon, which avoids carbonization, i.e., the cracking of hydrocarbon with production of soot, is obtained. This means may, moreover, be used independently of the structure of the hydrogen generation device, which is the subject of the present application.

This arrangement of the present invention makes it possible to coordinate the flow rate of the liquid with the flow rate of the vapor. In particular, it is ensured that the entire quantity of the liquid hydrocarbon introduced is vaporized almost instantaneously.

The spraying in the form of droplets makes it possible to maximize the exchange surface of the liquid with the hot gaseous environment and contributes to the result of equality between the instantaneous flow rates of introduced liquid and of vaporized liquid.

According to yet another arrangement of the present invention, which can be used independently of the arrangements explained above, an annular space is provided, for example, in one of the zones, comprising means for ensuring a coiled circulation of the fluid in order to homogenize the temperature of the walls and of the fluid circulating in this annular space, these coiled circulation means being additionally equipped to perform a bracing function between the walls of this annular space.

Preferably, in this case, the annular space constitutes a heat exchange space, designed so that the pitch of the coiled circulation is such that the heat exchanges are optimized.

According to one embodiment, the reaction chamber comprises a combustion part, in which a combustion is carried out for which the temperature is more or less greater than the temperature in the rest of the reaction chamber, this part having a more or less cylindrical shape, and the device comprises:
  means for injecting the mixture of water vapor and hydrocarbon in the combustion part in a more or less tangential manner along the walls, and
  means for injecting the oxygen in the direction of the axis of the combustion part,
  the design being such that the mixture of water vapor and hydrocarbon injected in a more or less tangential manner constitutes a thermal protection of the cylindrical wall of the combustion part, the combustion occurring in the vicinity of the axis and the protection being produced by establishing a gas screen protecting the wall against the heat produced both by convection and by radiation.

It shall be noted that this embodiment may also be used independently of the other arrangements of the present invention. In particular, it can be used independently of the structure of the device with reaction chamber surrounded by two annular zones.

In one embodiment, the device comprises at one end, against which the reaction chamber and the first, second and third zones abut, a block comprising:
  means for ducting the fluids and ensuring the connections of the zones to one another or to the external environment,
  means for fixing some of the walls separating the different zones and the reaction chamber and ensuring the tightness between these zones, the reaction chamber and the external environment, and
  means for making possible the removal of at least some of the said walls.

Preferably, the reactive fluids are introduced in the different zones and in the reaction chamber at a pressure more or less greater than atmospheric pressure.

In this case, the second zone may be delimited by, on the one hand, an outer wall resistant to pressure and, on the other hand, an inner wall which is integral with this outer wall.

BRIEF DESCRIPTION OF THE DRAWINGS

Other features and advantages of the present invention shall appear from the description of some of its embodiments, this description being provided with reference to the attached drawings, in which.

DETAILED DESCRIPTION

An embodiment of a hydrogen generating device (or reformer) will now be described in relation to the figures. This device produces a mixture mainly of $H_2$ and CO, containing also $CO_2$ and $H_2O$, which is introduced into another device (not shown) which again produces hydrogen from the action of $H_2O$ on CO for converting it into $CO_2$.

Figure 1:
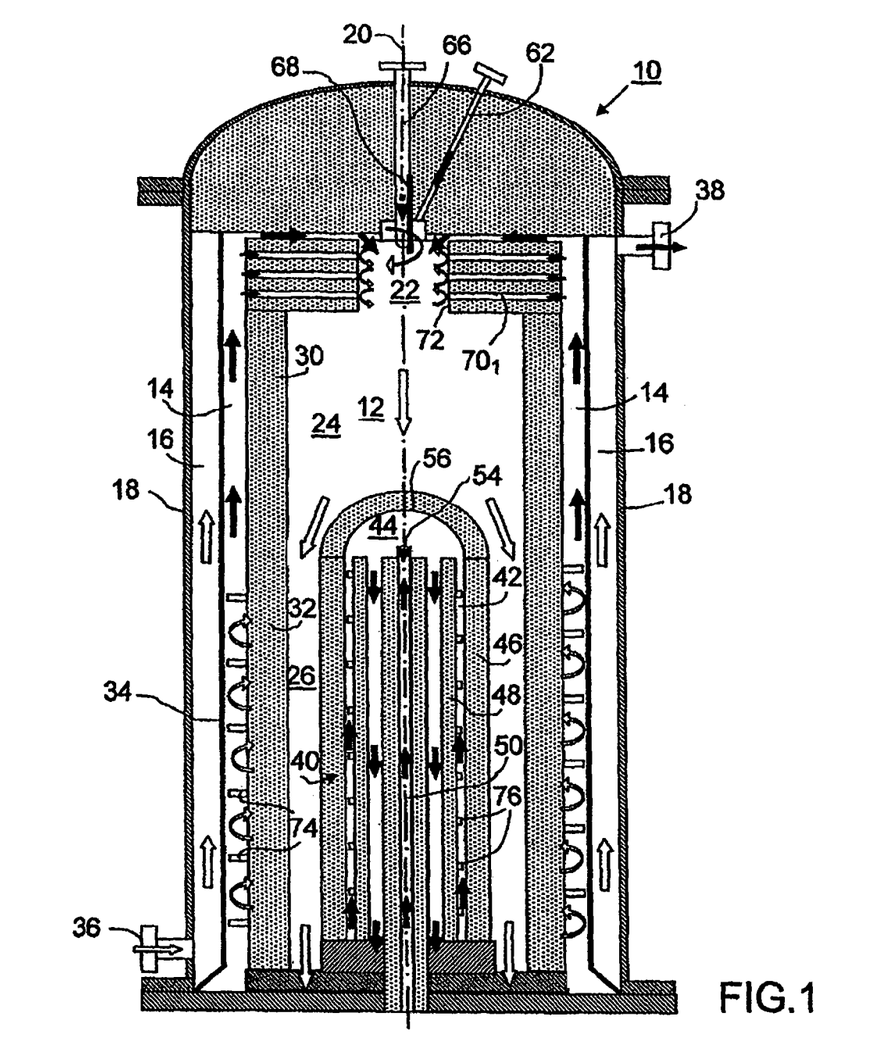
FIG. 1 is a diagram of a part of a reforming device according to the present invention.

According to the present invention, the device 10 shown in FIG. 1 comprises a central part or core constituting the reaction chamber 12, or the reformer itself, its temperature being suitable for reforming diesel fuel, between 1,000° C. and 1,400° C., and this core is surrounded by a first annular zone 14 in which a water+diesel fuel mixture circulates at a temperature of 400° C. to 900° C. (typically 700° C.) which recovers the heat lost by the reformer 12.

The first annular zone 14 is itself surrounded by a second annular zone 16 constituting a preheater and water vaporizer. The pressure prevailing in the device being, in the example, 55 bars, the temperature of the water vaporizer is 270° C., i.e., the boiling point of water at this pressure of 55 bars. The vaporizer 16 recovers the heat yielded by the water+diesel fuel mixture in the first annular zone 14.

Thus, the outer wall 18 of the device is at a temperature of 270° C., which makes possible the selection of a metal resistant to the moderate temperature of the jacket and to the high pressure prevailing in the device.

The device has a general cylindrical shape with an axis 20 shown vertically in the figure.

The reaction chamber 12 comprises, in its top part, a combustion chamber 22 having a more reduced diameter than that of the chamber 12.

The reaction chamber or reformer 12 comprises two parts 24 and 26. In the first part 24, the reforming reaction is carried out at a high temperature, 1,000° C. to 1,400° C. in the embodiment of the device shown here. This part 24 contains the combustion chamber 22 in its upper part.

The second part 26 of the chamber 12 constitutes mainly a part for discharging the reaction products, the reforming gases and heat exchanges with the reactive fluids to be preheated before their entry into the chamber 12. The height of the part 26 is optimized so that the heat exchanges are sufficient; in the embodiment shown here, it is greater than that of the zone 24. In the lower part, the reforming gases have thus been cooled to a temperature on the order of 350° C. to 450° C.

The outer cylindrical wall 30 of the upper part 24 of the chamber 12 has mainly a function of thermal insulation, while the cylindrical wall 32 of the lower part 26 of the chamber 12 has mainly a function of heat exchange with the annular zone 14.

The wall 34 separating the annular zones 14 and 16 has mainly a function of heat exchange between these zones. The wall 34 is integral with the outer wall 18.

The second annular zone 16, which is the most remote from the axis 20, has at its lower part the openings 36 receiving water at ambient temperature, i.e., about 25° C., and at its upper part, this zone 16 has vapor discharge openings 38, water being vaporized in this zone 16 at the temperature of 270° C. The vaporization is obtained by the heat recovered from the zone 14.

The water vapor exiting from the zone 16 is introduced into a central zone 40 more or less occupying the height of the lower part 26 of the chamber 12. This central zone constitutes a third heat recovery zone.

This third zone itself comprises an outer annular zone 42 in which the water vapor, which is introduced at the lower part at 270° C., is superheated to reach the temperature of 500° C. to 700° C. in the upper part. The superheating of the water vapor is obtained thanks to the outer exchange wall 46 of the zone 40, which is in contact with the reforming gases.

A tube 50 for introducing the diesel fuel, consisting of a tube having a diameter more or less lower than that of the tube 48, is located inside the inner cylindrical wall 48 of the annular zone 42. The tube 50 is made of a thermally insulating material so as to avoid overheating and carbonization of the diesel fuel that circulates in the tube 48.

This tube has at its upper end 54 an injection nozzle, which sprays the diesel fuel introduced in the lower part in fine droplets. Thus, the diesel fuel comes into contact with the superheated water vapor. It is vaporized almost immediately. If the droplets of diesel fuel are not vaporized by mixing with the superheated water vapor, they are so by contact with the concave wall 56 of the upper part 44 of the zone 40.

Hence, the volume of this upper part 44 of the central zone 40 forms the mixer/evaporator. This volume is minimized thanks to the evaporation of the residual diesel fuel against the wall 56.

The embodiment of the water+diesel fuel mixture in the upper part 44 of the zone 40 prevents the carbonization, i.e., the cracking of the diesel fuel and the production of carbon particles in the form of soot, which would risk clogging the various ducts or annular zones.

The water vapor+diesel fuel mixture, which thus occurs in the upper part 44 of the zone 40, has a temperature of 400° C. to 550° C. It is then discharged by the annular zone between the tube 50 and the tube 48. The cylindrical wall 48 itself constitutes a wall of heat exchange with the annular zone 42, in which the water vapor circulates. The heat exchanges thus make it possible to start the superheating of the water+diesel fuel mixture.

The water+diesel fuel mixture is then introduced in the lower part of the first annular zone 14 surrounding the reaction chamber to be finally introduced in the upper part in the combustion chamber 22.

When the mixture rises in the annular zone 14, it is reheated by heat exchange with the wall 32 and the wall 30 at a temperature of 600° C. to 900° C. (typically 700° C.). Of course, the water+diesel fuel mixture is heated mainly thanks to the wall 32 of the part 26. However, about the wall 30, the heating continues but to a lesser degree because the wall 30, while being mainly insulating, allows a small amount of heat to pass, however.

In the combustion chamber, the water+diesel fuel mixture enters at a temperature of typically 700° C.

Pure oxygen is introduced into the combustion chamber 22 by means of one or more ducts 62 in the direction of the axis 20. This (these) duct(s) 62 is (are) slightly inclined in the direction of the axis 20 so as to generate a gas flow about this axis.

A retractable injection nozzle 66 for introduction of diesel fuel at the startup of the operation of the device is also provided in the upper part of the device 10, above the combustion chamber 22. A retractable ignition plug 68, whose end is located in the chamber 22, is also provided in the upper part of the device 10, in the vicinity of the axis 20. This arrangement makes it possible to start the unit by producing a combustion of the diesel fuel in order to produce the heat needed for the rise in temperature of the walls of the different zones of the device. Then, as was seen above, it is the operation itself of the device that produces the heat, making it possible to preheat the fluids introduced into the chamber 12.

Ducts $70_1$, $70_2$, ..., oriented in such a way (FIG. 2) that this water+diesel fuel mixture circulates along the walls circumferentially around the axis 20, are provided between the upper part of the annular zone 14, in which the water+diesel fuel mixture circulates, and the combustion chamber 22. In other words, the ducts $70_1$, $70_2$, etc. do not have a radial direction but a direction close to a tangential direction.

Figure 2:
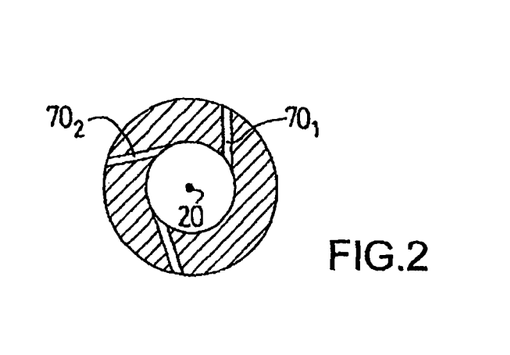
FIG. 2 is a diagram of a part of the device shown in FIG. 1.

Thus, the almost tangential arrival of the water+diesel fuel mixture creates a film in the vicinity of the wall 72 of the combustion chamber 22, while oxygen is injected in the direction of the axis of the chamber in a quantity insufficient to burn all the hydrocarbon. The result of this is that the combustion is carried out practically along the axis 20 of the combustion chamber and not in the vicinity of the walls. Under these conditions, this wall 72 is insulated in relation to the flame. Consequently, the wall 72 is at a temperature more or less lower than that resulting from the combustion. In fact, the combustion is carried out at a temperature on the order of 2,500° C. to 3,000° C. and the walls 72 are at a temperature on the order of 1,000° C. to 1,600° C. This protection of the wall 72 is also reinforced by the fact that the water vapor absorbs the radiation of the flame. In other words, the wall 72 is protected from the heat of the combustion both for the heat transferable by convection and for the heat transferable by radiation.

A rib arranged in a coil having the reference 74 in the annular space 14 and the reference 76 in the annular space 42 is provided in the annular space 14 as well as in the annular space 42.

The coiled rib 74 in the annular zone 14 is integral with the exchange wall 32, while the coiled rib 76 in the annular zone 42 is integral with the tube 48.

These coiled ribs make it possible to increase the heat exchanges. In fact, it is known that the smaller the hydraulic diameter is, the more effective are the heat exchanges. The hydraulic diameter is equal to 4S/P, S being the cross section of flow of the gas and P being the perimeter corresponding to this cross section S. The cross section of flow is delimited by the two walls of each ring and the pitch of the coil. Thus, a suitable choice of the distance between the facing walls and of the pitch of the coil makes it possible to minimize the hydraulic diameter.

Moreover, the coiled rib makes it possible to increase the rate of flow of the gases, which again improves the heat exchange in the annular zone in which the rib is located.

Thus, the exchange wall 32 is almost at the temperature prevailing in the annular space 14. In fact, the coefficient of exchange on the side of the reaction chamber, which is free from a coiled rib, is lower. In other words, the wall is brought to a temperature close to that of the fluid circulating on the side where the coefficients of heat exchanges are highest.

The coiled ribs also offer the advantage of making possible a better circumferential homogenization of the temperature around the axis 20 because the gases do not flow according to a single generator but circulate about the entire axis. The result of this is that there is no deformation that would be due to differences in circumferential temperatures or circumferential differences in flow rate.

Finally, the coiled ribs constitute braces between the cylindrical walls, for example, between the wall 32 and the wall 34 for the annular zone 14, which increases the rigidity and keeps constant the distance between the facing walls and hence again prevents axial or circumferential deformations and circumferential heterogeneities of temperature and flow rate which would result.

The coiled ribs can be made from a round (solid or hollow) profile section having a diameter greater than the annular space. This round profile section is welded to one of the walls and the opposite part is truncated, for example, by machining, so that the profile section might be housed in the annular space. The differential thermal expansions between the two walls must, however, be taken into account. A compact machining and a welding of the profile section to the walls would introduce high thermomechanical stresses. Therefore, the machining is such that it leaves sufficient clearance between the truncated vertex of the rib and the opposite wall (to which the profile section is not welded) to absorb the differential thermal expansions. This clearance induces an escape flow for the gas. However, the laminar character of the escape flow in this highly reduced space also contributes significantly to the heating of the gas, which limits the adverse effect of this part of the flow, whose course is not helical.

As a variant, the coiled rib is produced by the machining of the wall in which a coiled groove is hence formed. The duct is then closed by spot welding of the complementary wall.

The embodiment, in which the wall is machined, is more particularly advantageous for rib heights of 0.5 mm to 1.5 mm, while an embodiment by means of a profile section is preferable for rib heights of 1.5 mm to 4 mm.

The outer wall 46 of the zone 40, i.e., the wall ensuring the heat exchange between the reaction chamber and the superheated water vapor, is metallic on the inner side. On the outer side, i.e., on the side in contact with the reaction chamber, it is coated with conductive refractory ceramic so that this wall is protected against the effect of hot reforming gases.

Likewise, the wall 32 of the second part of the reforming chamber is, on the outer side, metallic, and on the inner side, i.e., on the side of the reaction chamber, it is protected by a conductive refractory ceramic.

The element that is located at the base of the device 10 will now be described in relation to FIG. 3.

This element 100 ensures the distribution and the tightness of the fluids between the different zones, the reaction chamber and the external environment. It also ensures the fixing of the exchangers. In addition, it is equipped to make possible the disassembly of the device 10. It also ensures the discharge of gases from the reforming chamber.

Figure 3:
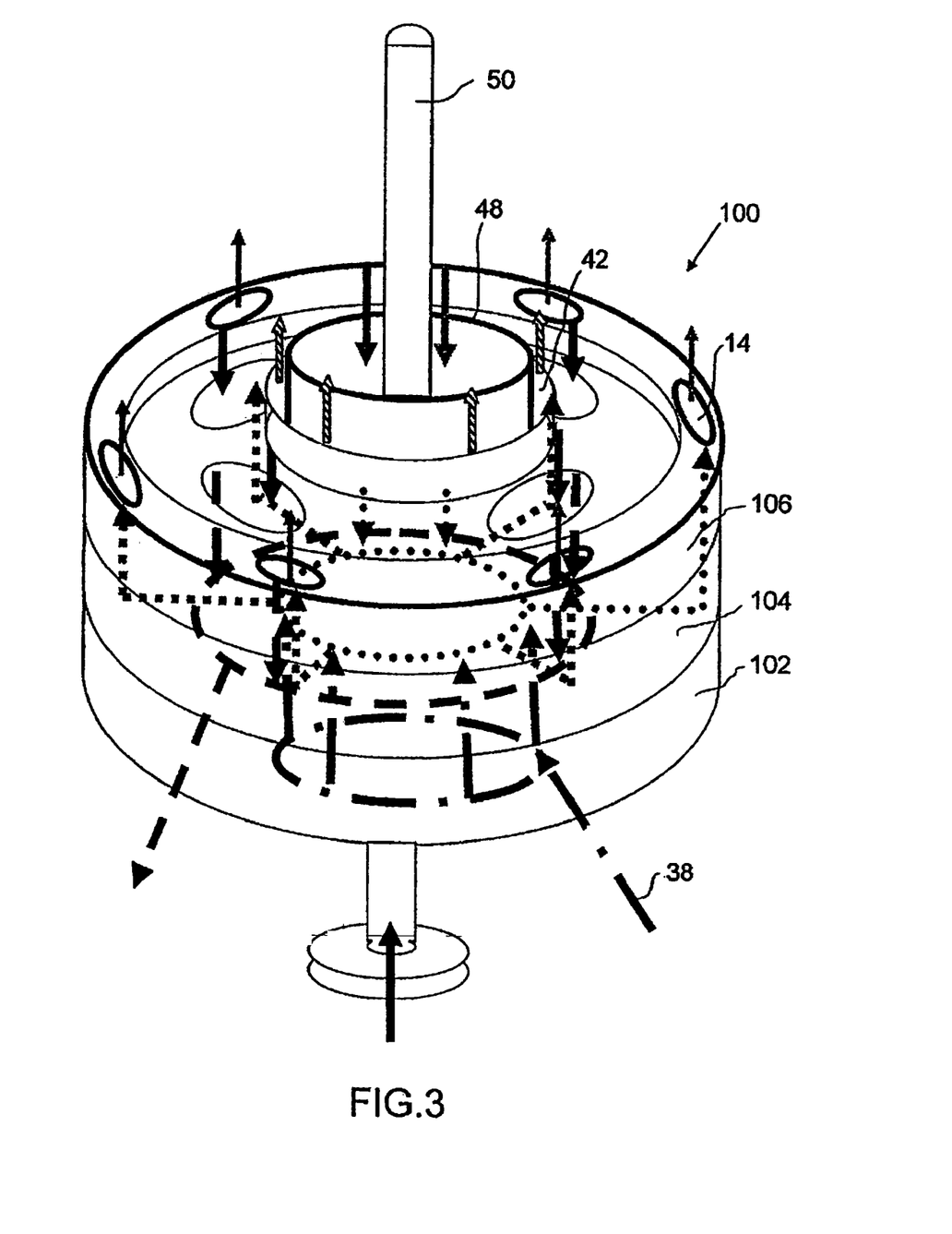
FIG. 3 is a diagram of another part of the reforming device according to the present invention.

In the embodiment shown in FIG. 3, three disks, each of which is assigned to a particular fluid, are provided.

Thus, the objective of the lower disk 102 is to lead the water vapor coming from the outlet 38 of the annular zone 16 to the zone 42 of the part 40 of the device.

The objective of the intermediate disk 104 is to channel the water+diesel fuel mixture from the annular space between the tube 48 and the tube 50 to the annular zone 14.

The upper disk 106 is intended for the collection of the reforming gas for its discharge to the outside.

The three disks are traversed by the tube 50 for injecting diesel fuel.

Moreover (FIG. 4), the disk 102 is integral with the tube 48 constituting the inner wall of the zone 42. By contrast, the outer wall 46 of the part 40 is carried by the disk 104.

Figure 4:
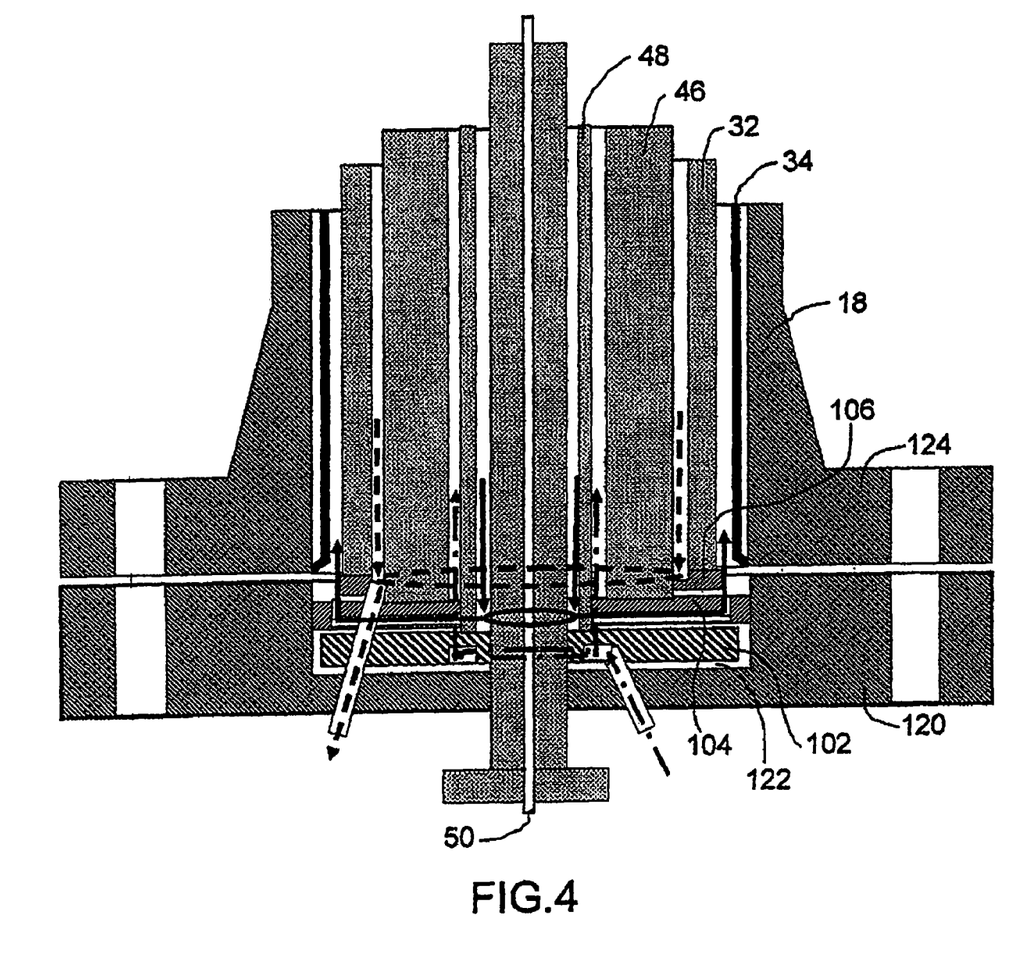
FIG. 4 is a diagram showing the assembly of the parts of the device shown in FIGS. 1 and 3.

The disk 106 is integral with the wall 32, i.e., the inner wall of the annular space 14 being used to preheat the water+diesel fuel mixture.

FIG. 4 shows a general view of the lower part of the device 10, which comprises, besides the element 100, a basic collar 120, which has at its upper part a housing 122 for the element 100. This collar 120 is fixed to a countercollar 124 welded to the outer wall 18 at its upper part. Of course, the collar 120, the countercollar 124 and the wall 18 are such that they make it possible to resist the major pressure prevailing in the device 10.

What is claimed is:

1. A device for generating hydrogen from reactive fluids including a liquid or gaseous hydrocarbon, oxygen and water comprising:
    a reaction chamber into which the reactive fluids are introduced to perform a reforming reaction, which produces hydrogen and carbon oxides, this reaction being carried out at high temperature,
    a first, approximately cylindrical zone surrounding the reaction chamber and in which circulates a mixture of the reactive fluids to be introduced into the reaction chamber, to the exclusion of the products of the reaction, this zone being separated from the reaction chamber in order to recover, at least in part, the heat lost by the reaction chamber, so as to preheat the mixture circulating in the first zone, the reagent or reagents being in direct contact with the walls of this first zone to carry out heat exchanges,
    a second, approximately cylindrical zone surrounding the first zone and in which circulates water to be preheated and vaporized, the water being in direct contact with the walls of this second zone, the separation between the first and second zones being such that the water circulating in the second zone recovers the heat lost by the first zone in order to preheat the water, and
    means for mixing water from the second zone with the hydrocarbon before introducing the mixture in the form of vapor into the first zone,
    the design being such that an inner surface of an outer wall of the device, is made up of an inner surface of an outer surface of the second zone, in contact with the water, is at a lower temperature than the temperature of the reaction chamber
    wherein the means for mixing water from the second zone with the hydrocarbon before introducing the mixture in the form of vapour into the first zone are located in a third zone located in a lower part of the reaction chamber,
    the means for mixing comprising
    an outer annular zone delimited by an inner and an outer wall, the water vapour coming from the second zone being introduced in the outer annular zone to be superheated at an upper part of the third zone, the superheating of the water vapour being obtained by contact of an outer exchange wall of the outer annular zone with the reforming gases,
    a tube for introducing the hydrocarbon, located inside the inner wall of the outer annular zone, this tube having at its upper end an injection nozzle which sprays the hydrocarbon in fine droplets, and
    a concave wall located at the upper part of the third zone allowing the droplets of hydrocarbon to vaporize by contact of said concave wall with these droplets,
    wherein the mixture of vaporized hydrocarbon and water circulates in the space between the tube and the inner wall of the annular zone to be introduced in the first zone.

2. Device in accordance with claim 1, in which the reaction chamber comprises two parts, the first of which is a seat of the reaction and a second of which constitutes a duct for discharging products of the reaction, these two parts being such that the heat exchange between the second part of the reaction chamber, which is closest to the duct, and the first zone is greater than the heat exchange between the first part of the reaction chamber and the first zone.

3. Device in accordance with claim 2, in which the discharge duct has a more or less rectilinear configuration, the products only circulating in only one direction in this discharge duct.

4. Device in accordance with claim 2 or 3 comprising a third zone inside the second part of the reaction chamber, this third zone being intended to recover heat of the second part of the reaction chamber in order to preheat reagents or fluids that circulate in the third zone, a wall separating the reagents or fluids, on the one hand, and the products of the reaction at high temperature, on the other hand, being more or less approximately cylindrical and smooth.

5. Device in accordance with claim 4, in which the third zone comprises:
    means for superheating the water vapor,
    means for vaporizing the liquid hydrocarbon and mixing it with the water vapor, and
    means for superheating the mixture of water vapor and hydrocarbon.

6. Device in accordance with claim 4, in which the hydrocarbon is gaseous and the third zone comprises:
    means for circulating the water in order to superheat it to form water vapor,
    means for mixing the gaseous hydrocarbon with the water vapor, and
    means for superheating the mixture of water vapor and gaseous hydrocarbon.

7. Device in accordance with claim 2 or 3 comprising:
    means for creating fine droplets of liquid hydrocarbon,
    means for mixing these droplets with water vapor, wherein a temperature of the water vapor makes it possible to vaporize at least a fraction of the droplets, and
    a hot surface, and in particular one heated by heat exchange with the reaction chamber, to a temperature sufficient to vaporize the fraction of the droplets not vaporized by mixing with the water vapor,
    the means for creating the droplets projecting the droplets towards the hot surface.

8. Device in accordance with claim 2 or 3, comprising an annular space in one of the zones, comprising means for ensuring a coiled circulation of fluid intended to be introduced into the reaction chamber in order to homogenize a temperature in the annular space, these coiled circulation means being additionally equipped to perform a bracing function between the walls of this annular space and a heat exchange function in the annular zone in which the coiled circulation means are located.

9. Device in accordance with claim 2 or 3, in which the reaction chamber comprises a combustion part, in which combustion is carried out for which a combustion temperature is greater than a temperature in other parts of the reaction chamber, this part having a more or less cylindrical shape, and in which the device comprises:
    means for injecting the mixture of water vapor and hydrocarbon in the combustion part in a more or less tangential manner along the walls, and
    means for injecting the oxygen in the direction of the axis of the combustion part, the design being such that the mixture of water vapor and hydrocarbon injected in a more or less tangential manner constitutes a thermal protection of the cylindrical wall of the combustion part, the combustion occurring near an axis of the device and the protection being produced by establishing a gas screen protecting the wall against the heat produced both by convection and by radiation.

10. Device in accordance with claim 2 or 3, comprising at one end, against which the reaction chamber and at least the first and second zones abut, a block comprising:
- means for ducting the fluids and ensuring connections of the zones to one another and to the external environment,
- means for fixing some of the walls separating the different zones and the reaction chamber and ensuring the tightness between these zones, the reaction chamber and the external environment, and
- means for making possible the removal of at least some of the walls.

11. Device in accordance with claim 2 or 3, in which the reactive fluids are introduced into the different zones and the reaction chamber at a pressure greater than atmospheric pressure.

12. Device in accordance with claim 11, in which the second zone is delimited by, on the one hand, an outer wall resistant to pressure and, on the other hand, a wall which is integral with the outer wall.

\* \* \* \* \*